Sept. 21, 1965   J. TUOMEY   3,207,032
STRIP FILM PHONOGRAPH-PROJECTOR
Filed July 12, 1962
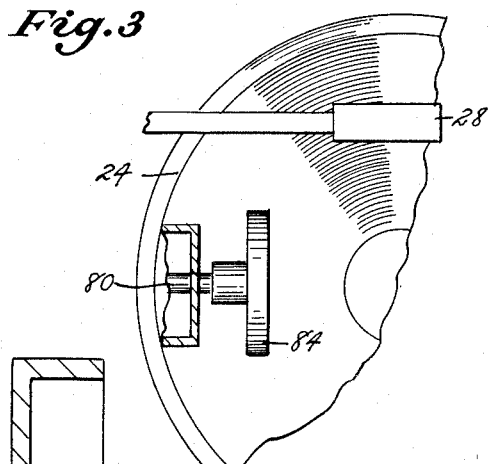
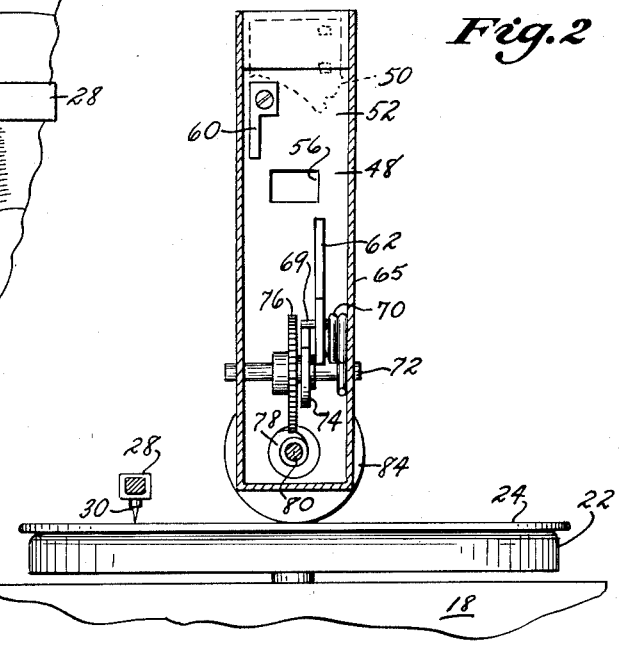
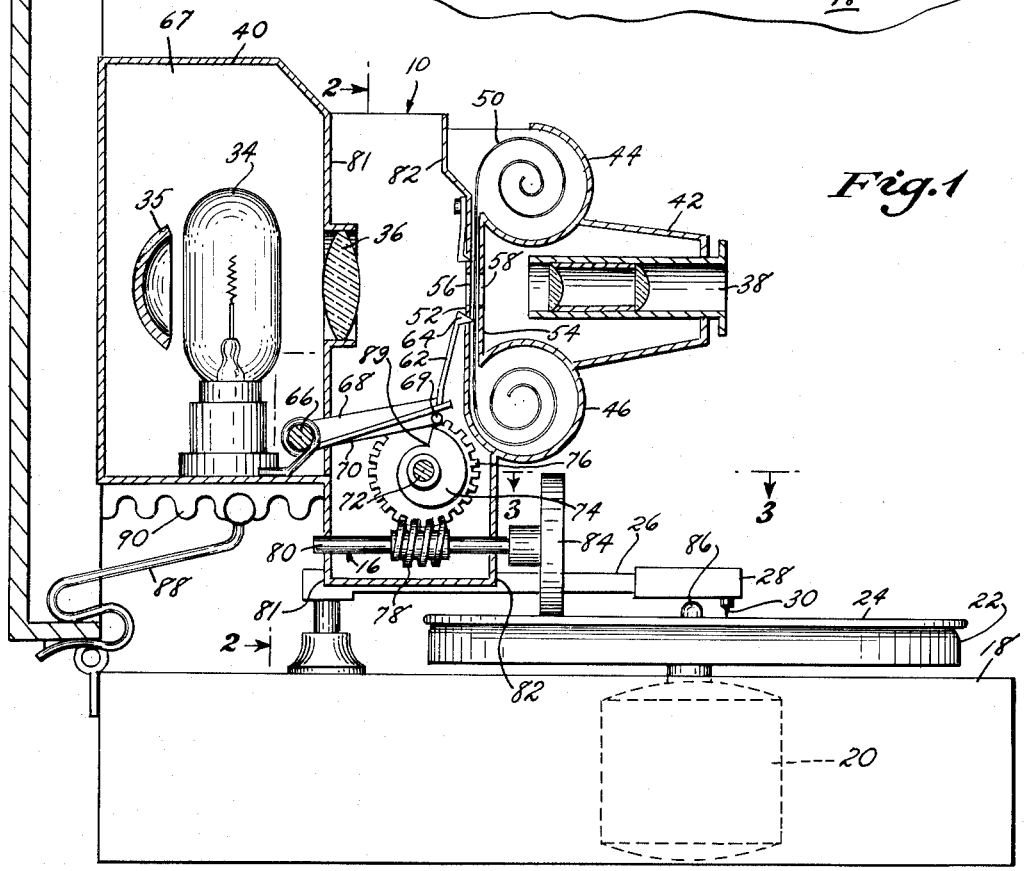

United States Patent Office 3,207,032
Patented Sept. 21, 1965

3,207,032
STRIP FILM PHONOGRAPH-PROJECTOR
John Tuomey, New York, N.Y. (27 Borage Place,
Forest Hills 75, N.Y.)
Filed July 12, 1962, Ser. No. 209,393
1 Claim. (Cl. 88—28)

This invention relates generally to the consecutive projection of strip film in synchronization with the production of sound from a phonograph record of the circular type. More particularly, the invention relates to the strip film pictures and advanced in synchronization with the sound by means of a drive wheel on the projector making contact and being driven by the phonograph record.

Another object herein lies in the provision of structure of the class described wherein the drive wheel, driven by the phonograph record, in turn drives a uniform rising single-lobe cam which stores energy in a spring for a major portion of the rotation, and then releases the spring to actuate a claw which advances the film strip.

A feature of the invention lies in the ease with which the present structure is adapted to conventional phonograph construction without special alteration.

Another feature of the present invention is that the phonograph-projector combination is simple, rugged, and of relatively low cost.

Another object herein lies in the provision of combination phonograph-projector construction so that power consumption of the projector is low and even and peak loads are avoided. Such peak loads are especially disadvantageous in that by periodically slowing the phonograph record movement, they impair the quality of the sound reproduction obtained therefrom.

These objects, and other incidental ends and advantages, will more fully appear in the progress of this disclosure, and be pointed out in the appended claims.

In the drawing, in which similar reference characters designate corresponding parts throughout the several views:

FIGURE 1 is a side elevational view showing a preferred embodiment of the invention.

FIGURE 2 is a fragmentary sectional view as seen from the plane 2—2 on FIGURE 1.

FIGURE 3 is a fragmentary horizontal sectional view as seen from the plane 3—3 on FIGURE 1.

In accordance with the invention, the device, generally indicated by reference character 10, comprises broadly a projector 12, a phonograph 14, and a film-advancing and synchronizing mechanism 16.

The phonograph 14 may be of conventional design, having a base 18 which encloses a motor 20, the latter driving the turntable 22 which supports and rotates a record 24. Phonograph 14 also includes a rotatably mounted pick-up arm 26 having the pick-up 28 with stylus 30. The stylus 30 may be electrically connected to any suitable sound reproducing device, such as an amplifier and speaker (not shown). The phonograph 14 may be provided with a cover 32 adapted to close the same when not in use, after the projector 12 has been removed therefrom.

The projector 12 may be of suitable construction, including a light source 34 with reflector 35, a condensing lens 36, and optical system 38. The projector 12 is provided with a casing 40, which is adapted to substantially conceal the light source 34, provide a support for the system 38, indicated by reference character 42, and to carry an unprojected magazine 44, a projected magazine 46, film guide means 48, within which is slidably disposed the strip film 50.

The guide means 48 may include a pair of spaced and parallel vertically arranged plates 52 and 54, with aligned orifices 56 and 58. The strip film 50, as it passes from the magazine 44 to the magazine 46, is frictionally retained in adjusted position thereof by the action of the retarding finger 60. The finger 60 is in the form of a spring pawl which prevents the film from moving on the upstroke of the claw element 62.

The claw element 62 is preferably composed of resilient material which urges the tip 64 thereof forwardly so that the same may successively engage sprocket holes of the usual type in the strip film 50.

Pivotally mounted on a post 66, horizontally projecting from the wall 65, is a lever 68, at the end of which is a cam follower 69. The lever 68 is urged to move in a clockwise direction as viewed in FIGURE 1 by the spring 70.

Rotatably mounted on a spindle 72 is a plate cam 74, to which is affixed, or to which is keyed, the worm gear 76. The spindle 72 is, of course, suitably mounted either off the walls 65, 67 or from a bracket (not shown).

Meshing with the worm gear 76 is the worm 78, fixed to the horizontal shaft 80, the latter being suitably journalled in the transverse walls 81 and 82. The forward end of shaft 80 projects, and has secured thereto, the drive wheel 84. Wheel 84 may be provided with a suitable friction surface such as an annular rubber band which is adapted to engage the upper surface of the circular record 24.

It will be understood, of course, by those skilled in the art to which the present invention relates, that the peripheral speed of the drive wheel 84 will be affected by the position it occupies with respect to the shaft 86 which drives the turntable 22. Thus, suitable markings may be employed upon the record 24 to indicate the circle which the wheel 84 will traverse as the record is rotated therebeneath.

While the position of the drive wheel 84 with respect to the record 24 may be predetermined, I have shown a structure in the lower left-hand portion of FIGURE 1 including a support bracket 88 which is adapted to selectively engage a plurality of spaced grooves 90, so that by gravity the projector 12 may be supported thereon. Shifting the bracket 88 into the different grooves will offer an adjustment with respect to the positioning of the drive wheel 84 and its correlation to the record 24. It may be noted that by the arrangement shown in FIGURE 1, the center of gravity of the projector lies forwardly of the bracket 88 so that weight is applied upon the drive wheel 84, assuring proper traction without slippage.

In use, it is desirable that the parts be correlated at the beginning of use. This may be accomplished, for example, by manually rotating the drive wheel 84 until the follower 69 has dropped down to the lowest portion of the cam dwell 89. At this point, a predetermined frame of the film 50 is disposed in the aligned orifices 56 and 58, and the projector is placed so that the wheel 84 engages the record on a predetermined track area. When the motor 20 is energized, with the stylus 30 in place, sound will begin to emanate from the phonograph and the worm 78 will rotate to move the cam 74 in a clockwise direction, as viewed in FIGURE 1. This will gradually elevate the follower 69 and with it the claw element 62, which will not move the film 50 in an upward direction because of the retarding finger 60. Because of the step-down action of the worm 78, little extra load is placed upon the motor 20 in moving the follower 69 and hence displacing the spring 70. This results in gradual cocking of the spring without materially affecting the speed of rotation of the turntable 22. After a predetermined number of revolutions of the record, the follower 69 will reach the sharp, sudden drop in the plate cam as the dwell area is reached, and the claw element will rapidly descend engaging the film 50 and advancing the same one frame. This will occur in correlation and synchronism with the sound coming from the track on the record.

It will be noted that the bracket 88 may be in the form of a spring clip which is adapted to be attached to the cover of the phonograph, and this permits the projector to pivot at any one of a number of points, thus allowing it to accommodate to phonograph cases of different sizes.

Because the cam follower 69 may coact with a single lobe cam on a common shaft with the worm gear 76, these parts may be simply and inexpensively fabricated, as, for example, by injection molding of plastic or die casting of metal. This is also true of the worm 78 and the drive wheel 84 on the shaft 80.

It may thus be seen that I have disclosed a novel and useful strip film phonograph-projector, which, because of the simplicity thereof, may be constructed at relatively low cost and have a long trouble-free life. It is simply synchronized so that the same may be operated by relatively unskilled persons.

I wish it to be understood that I do not wish to be limited to the exact details of construction shown and set forth in this specification, for obvious modifications will occur to a person skilled in the art to which the invention relates.

I claim:

In combination, a phonograph having a turntable and a record supported and driven thereby, a strip film projector for use with a film movable in a guide thereon, gripping means engageable with said film, a spring connected to said gripping means, and when wound urging said gripping means to move said film in an advancing direction, a uniform rising single lobe cam connected with said spring, speed reducing means, a drive wheel riding on the record and driving said speed reducing means, said speed reducing means driving said cam which serves to store energy in said spring, said cam having a sudden drop to dwell, which releases the spring to move the gripping means and advance the film.

References Cited by the Examiner

UNITED STATES PATENTS

| 1,101,760 | 6/14 | Seemann | 88—28 |
| 1,678,568 | 7/28 | Humphrey | 352—32 |

FOREIGN PATENTS

| 1,092,139 | 11/54 | France. |
| 152,633 | 5/21 | Great Britain. |
| 325,127 | 2/30 | Great Britain. |

NORTON ANSHER, *Primary Examiner.*

WILLIAM MISIEK, *Examiner.*